US010120377B2

(12) United States Patent
Lai et al.

(10) Patent No.: US 10,120,377 B2
(45) Date of Patent: Nov. 6, 2018

(54) MULTIPLE UNMANNED AERIAL VEHICLE AUTONOMOUS COORDINATION

(71) Applicant: International Business Machines Corporation, Armonk, NY (US)

(72) Inventors: Jui-Hsin Lai, White Plains, NY (US); Yu Ma, White Plains, NY (US); Conglei Shi, New York, NY (US); Yinglong Xia, Rye Brook, NY (US)

(73) Assignee: International Business Machines Corporation, Armonk, NY (US)

( * ) Notice: Subject to any disclaimer, the term of this patent is extended or adjusted under 35 U.S.C. 154(b) by 133 days.

(21) Appl. No.: 15/236,409

(22) Filed: Aug. 13, 2016

(65) Prior Publication Data

US 2018/0046181 A1 Feb. 15, 2018

(51) Int. Cl.
*G05D 1/00* (2006.01)
*G08G 5/00* (2006.01)
*H04W 4/02* (2018.01)
*G05D 1/10* (2006.01)

(52) U.S. Cl.
CPC .......... *G05D 1/0027* (2013.01); *G05D 1/104* (2013.01); *G08G 5/0013* (2013.01); *H04W 4/023* (2013.01)

(58) Field of Classification Search
CPC .... G05D 1/0027; G05D 1/104; G08G 5/0013; H04W 4/023
USPC ........................................................ 701/1, 2
See application file for complete search history.

(56) References Cited

U.S. PATENT DOCUMENTS

| 7,737,878 | B2 |   | 6/2010 | van Tooren et al. |
| 8,086,351 | B2 | * | 12/2011 | Gaudiano .............. G05D 1/104 700/245 |
| 8,186,589 | B2 | * | 5/2012 | Ben Asher ............. G05D 1/104 235/411 |
| 9,104,201 | B1 | * | 8/2015 | Pillai ..................... B64C 39/024 |
| 9,254,363 | B2 |   | 2/2016 | Levien et al. |
| 9,334,052 | B2 | * | 5/2016 | Pasko .................. B64C 39/024 |
| 9,599,994 | B1 | * | 3/2017 | Bogdanowicz ........ G05D 1/104 |
| 9,604,723 | B2 | * | 3/2017 | Liu ........................ B64C 39/024 |
| 9,638,802 | B2 | * | 5/2017 | Park ....................... G01S 19/01 |

(Continued)

OTHER PUBLICATIONS

Se et al., "Stereo-vision based 3D modeling and localization for unmanned vehicles." International Journal of Intelligent Control and Systems 13.1 (2008). pp. 47-58.
Campa et al. "A comparison of pose estimation algorithms for machine vision based aerial refueling for UAVs." Control and Automation, 2006. MED'06. 14th Mediterranean Conference on. IEEE, 2006. pp. 1-6.

(Continued)

*Primary Examiner* — Jaime Figueroa
(74) *Attorney, Agent, or Firm* — Daniel P. Morris; Otterstedt, Ellenbogen & Kammer, LLP (57) ABSTRACT

At each of a plurality of unmanned aerial vehicles operating in a three-dimensional space, current relative locations of other ones of the plurality of unmanned aerial vehicles which are visible to each of the plurality of unmanned aerial vehicles are determined based on two-dimensional camera images from on-board dual-lens cameras. The current relative locations are wirelessly transmitted to a controller. At the plurality of unmanned aerial vehicles, specification of a path to be followed by each of the plurality of unmanned aerial vehicles is wirelessly received from the controller. At each of the plurality of unmanned aerial vehicles, on-board collision avoidance is carried out based on the two-dimensional camera images from the on-board dual-lens cameras, while following the path specification.

20 Claims, 8 Drawing Sheets

(56) References Cited

U.S. PATENT DOCUMENTS

| | | | | |
|---|---|---|---|---|
| 9,654,200 | B2* | 5/2017 | Mazzarella | H04B 7/18504 |
| 9,810,789 | B2* | 11/2017 | Levien | G01S 19/21 |
| 9,833,901 | B2* | 12/2017 | Perrone | G05D 1/0088 |
| 2004/0134336 | A1* | 7/2004 | Solomon | B64C 39/024 89/1.11 |
| 2006/0106506 | A1* | 5/2006 | Nichols | G05D 1/101 701/3 |
| 2007/0106473 | A1* | 5/2007 | Bodin | G01C 23/00 701/301 |
| 2009/0125163 | A1* | 5/2009 | Duggan | G05D 1/0061 701/2 |
| 2009/0299551 | A1* | 12/2009 | So | B64C 39/024 701/3 |
| 2010/0185672 | A1* | 7/2010 | Rising | G06F 17/30274 707/780 |
| 2014/0046589 | A1 | 2/2014 | Metzler et al. | |
| 2015/0063202 | A1* | 3/2015 | Mazzarella | H04B 7/18504 370/316 |
| 2015/0120126 | A1* | 4/2015 | So | G01C 23/00 701/26 |
| 2015/0201309 | A1* | 7/2015 | Liu | H04W 4/025 455/456.1 |
| 2017/0069214 | A1* | 3/2017 | Dupray | G08G 5/0021 |
| 2017/0250749 | A1* | 8/2017 | Mazzarella | H04B 7/18504 |
| 2017/0359515 | A1* | 12/2017 | Harris | H04N 5/23248 |
| 2018/0007518 | A1* | 1/2018 | O'Berry | H04W 4/046 |

OTHER PUBLICATIONS

Sanfourche et al. "Perception for UAV: Vision-Based Navigation and Environment Modeling." AerospaceLab 4 (2012): pp. 1-20.

Khan, "Swarm Eye: A Distributed Autonomous Surveillance System.", Diss, School of Applied Sciences, Cranfield University, (2011). pp. 1-107.

Prieditis et al. SmartSwarms: Distributed UAVs that Think. Lookahead Decisions Inc Davis CA, 2004. pp. 1-23.

Rasche et al. "Combining autonomous exploration, goal-oriented coordination and task allocation in multi-UAV scenarios." Autonomic and Autonomous Systems (ICAS), 2010 Sixth International Conference on. IEEE, 2010. pp. 52-57.

Andre et al. "Application-driven design of aerial communication networks." Communications Magazine, IEEE 52.5 (2014). pp. 129-137.

Gizmag magazine, Jan. 13, 2016, Nick Lavars, 100 drones fly in formation to set new Guinness World Record. Downloaded from http://www.gizmag.com/100dronesguinnessworldrecord/41328/ on Jun. 16, 2016. pp. 1-6.

Xu Chu (Dennis) Ding et al. Multi-UAV Convoy Protection: An Optimal Approach to Path Planning and Coordination. IEEE Transactions on Robotics, vol. 26, No. 2, Apr. 2010. pp. 256-268.

Jernej Mrovlje and Damir Vrancic, Distance measuring based on stereoscopic pictures, 9th International PhD Workshop on Systems and Control: Young Generation Viewpoint 1-3. Oct. 2008, Izola, Slovenia, pp. 1-6.

\* cited by examiner

$\delta_{i,j}$ := distance between $i$-th and $j$-th objects

These distances are the entries of the *dissimilarity matrix*

$$\Delta := \begin{pmatrix} \delta_{1,1} & \delta_{1,2} & \cdots & \delta_{1,I} \\ \delta_{2,1} & \delta_{2,2} & \cdots & \delta_{2,I} \\ \cdots & \cdots & \cdots & \cdots \\ \delta_{I,1} & \delta_{I,2} & \cdots & \delta_{I,I} \end{pmatrix}$$

The goal of MDS is, given $\Delta$, to find $I$ vectors $x_1,\ldots,x_I \in \mathbf{R}^N$ such that $\|x_i - x_j\| \approx \delta_{i,j}$ for all $i,j \in 1,\ldots,I$,

FIG.5

Algorithm SPRING (G:graph);
place vertices of G in random locations;
repeat M times
 calculate the force on each vertex;
 move the vertex $c_4$ * (force on vertex)
draw graph on CRT or plotter.

MULTIPLE UNMANNED AERIAL VEHICLE AUTONOMOUS COORDINATION

BACKGROUND

The present disclosure relates to applications of mobile technology and to unmanned aerial vehicles (UAVs).

Unmanned aerial vehicles have been developed for a number of uses, including surveillance, aerial filming, agricultural applications, and recreation. They are commonly referred to as drones. UAV designs include fuselage/wing assemblies resembling planes as well as helicopter and quadcopter configurations. Sensors such as gyroscopes, accelerometers, altimeters, global positioning system (GPS) modules, cameras and/or payload monitors may be incorporated within UAVs. Gimbals may be used to mount cameras in UAVs. Radio signals generated by a transmitter/receiver, a smartphone, a tablet or other device can be used to control a UAV. UAVs can operate partially or completely autonomously. Functions such as hovering and returning to home can, for example, be provided autonomously. Data obtained by UAVs can be stored onboard using, for example, Secure Digital (SD) cards, or transmitted wirelessly.

Current commercially available UAVs are typically controlled singly and have limited capacity to perform useful work beyond recreational functionality.

SUMMARY

Embodiments of the present disclosure provide techniques for autonomous coordination of multiple unmanned aerial vehicles.

In one aspect, an exemplary method is provided that includes, at each of a plurality of unmanned aerial vehicles operating in a three-dimensional space, determining, based on two-dimensional camera images from on-board dual-lens cameras, current relative locations of other ones of the plurality of unmanned aerial vehicles which are visible to each of the plurality of unmanned aerial vehicles; wirelessly transmitting the current relative locations to a controller; wirelessly receiving, at the plurality of unmanned aerial vehicles, from the controller, specification of a path to be followed by each of the plurality of unmanned aerial vehicles; and, at each of the plurality of unmanned aerial vehicles, carrying out on-board collision avoidance based on the two-dimensional camera images from the on-board dual-lens cameras, while following the path specification.

In another aspect, an exemplary system includes a plurality of unmanned aerial vehicles operating in a three-dimensional space, each of the unmanned aerial vehicles in turn including a memory, at least one processor coupled to the memory, an on-board dual-lens camera coupled to the processor, and a wireless interface to a remote controller. Each of the processors of the plurality of unmanned vehicles is configured to: determine, based on two-dimensional camera images from the on-board dual-lens cameras, current relative locations of other ones of the plurality of unmanned aerial vehicles which are visible to each of the plurality of unmanned aerial vehicles; wirelessly transmit the current relative locations to the remote controller; wirelessly receive, from the remote controller, specification of a path to be followed by each of the plurality of unmanned aerial vehicles; and carry out on-board collision avoidance based on the two-dimensional camera images from the on-board dual-lens cameras, while following the path specification.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of a computer program product including a computer readable storage medium with computer usable program code for performing the method steps indicated. Furthermore, one or more embodiments of the invention or elements thereof can be implemented in the form of a system (or apparatus) including a memory, and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

Techniques of the present invention can provide substantial beneficial technical effects. For example, one or more embodiments provide one or more of:

(i) A force-directed method to prevent collisions between UAVs;

(ii) A 3D coordinates construction method through two-lens cameras on UAVs.

These and other features and advantages of the present invention will become apparent from the following detailed description of illustrative embodiments thereof, which is to be read in connection with the accompanying drawings.

DETAILED DESCRIPTION

As noted, current commercially available UAVs are typically controlled singly and have limited capacity to perform useful work beyond recreational functionality. One or more embodiments advantageously coordinate the actions of multiple UAVs to provide enhanced functionality. It is currently impractical to manage multiple UAVs collaboratively using commercial human-controlled UAVs; coordination of the multiple UAVs is challenging. One challenging aspect is trajectory modelling in three-dimensional (3-D) space. Indeed, regarding current UAVs, the technology for military UAVs is not useful for many commercial applications; current focus is typically on single UAV control only, and, while images are captured, they are generally not analyzed.

In one or more embodiments, each UAV is both a worker and an observer. Each UAV sends images to a controlling computer. Computer vision algorithms are employed to compute the three-dimensional (3D) location(s) of multiple UAVs. Planning and scheduling functionality is employed to find safe paths and working areas for each UAV, and wireless communication is employed to control multiple UAVs.

Figure 1:
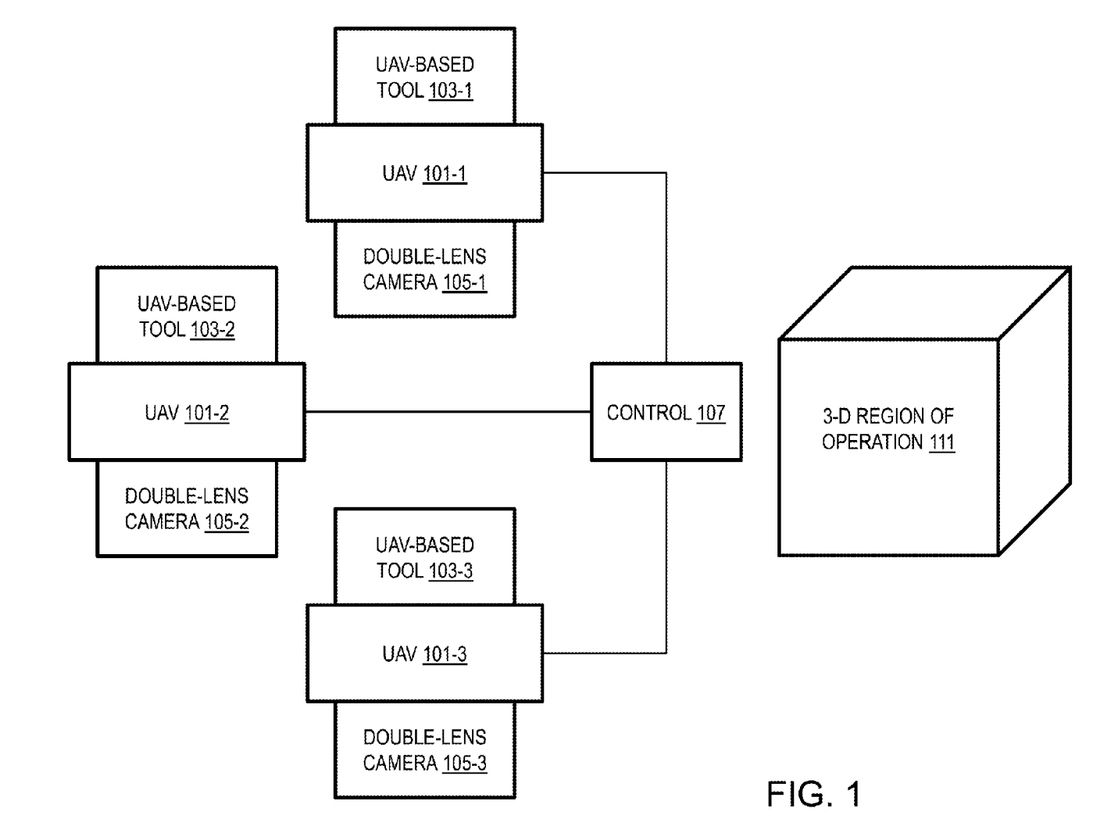
FIG. 1 is a block diagram of an exemplary system, in accordance with an aspect of the invention.

Referring to FIG. 1, in an exemplary embodiment, a number of UAVs 101-1, 101-2, and 101-3 (collectively, 101) each include a tool (e.g., spray painting spray nozzle with paint reservoir) 103-1, 103-2, and 103-3 (collectively, 103). Each UAV also includes a double lens (video) camera 105-1, 105-2, and 105-3 (collectively, 105). As used herein, a "double lens camera" is defined as a camera having two spaced-apart lens assemblies which permit emulation of binocular vision and thus depth perception. Non-limiting examples of suitable double lens cameras are described in Jernej Mrovlje and Damir Vrančić, Distance measuring based on stereoscopic pictures, 9th International PhD Workshop on Systems and Control: Young Generation Viewpoint, 1-3 Oct. 2008, Izola, Slovenia, expressly incorporated by reference herein in its entirety for all purposes. One or more embodiments calculate the relative position according to the difference between the two images captured by the two lenses. In a non-limiting example, the UAVs 101 are so-called quadcopters; however, other types can be used in other embodiments. Each UAV 101 is in wireless communication with a control station 107. This station can be a central computer such as a desktop or laptop, or a mobile device such as a smart phone or tablet, in each case, with appropriate antenna functionality. In another aspect, the control station can be a small data processing system integrated to one of the UAVs, or to another UAV that may or may not have a tool or the like. The control station should have adequate processing capability to carry out 3D remodeling and trajectory planning as described herein.

The UAVs operate in a 3-D region of interest 111. Three UAVs are shown for illustrative purposes but there can be different numbers of UAVs.

Figure 8:
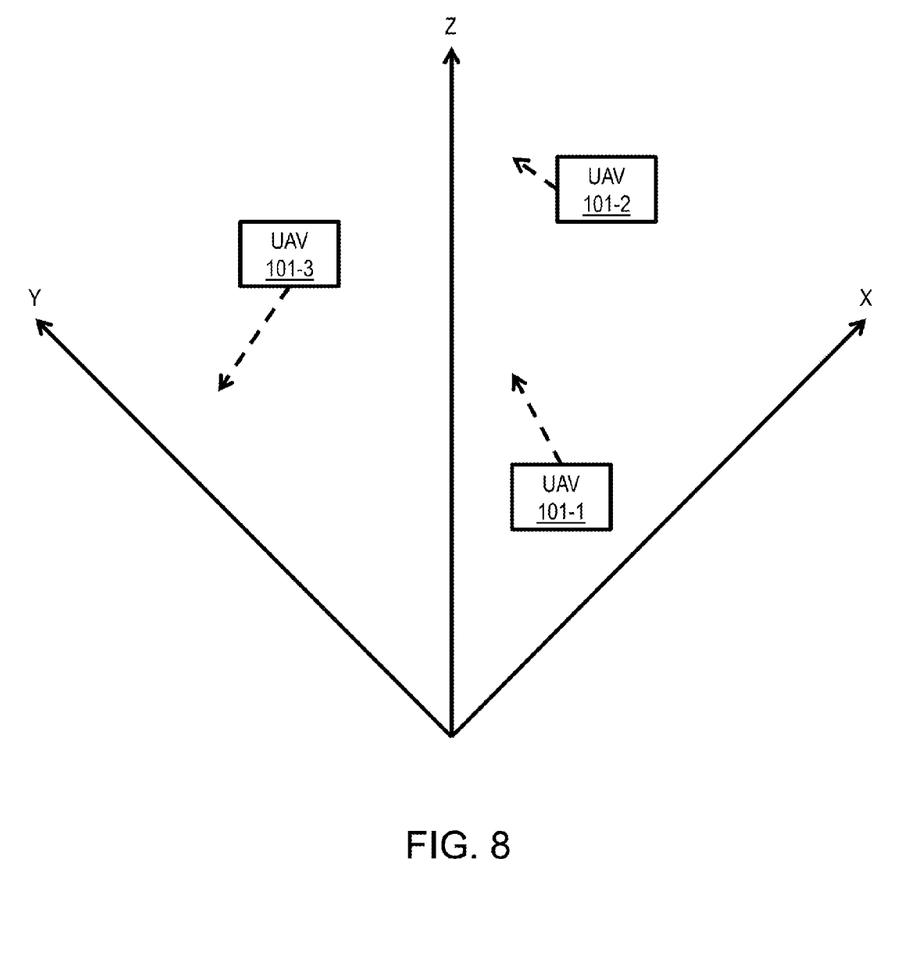
FIG. 8 shows further details regarding coordinate recovery, in accordance with an aspect of the invention.

Images from each UAV's camera 105 are wirelessly transmitted to control station 107. For example, camera 105-1 of UAV 101-1 may transmit an image of UAV 101-2 nearby and a relatively smaller image of UAV 101-3 far away; analogous images may be obtained from the other UAVs. Control station 107 collects and monitors these images as well as the status of each of the UAVs. In one or more embodiments, a UAV's "status" includes its coordinates in three-dimensional space (polar or Cartesian) and its velocity vector. Control station 107 processes the two-dimensional images received from the UAVs, and reconstructs a three-dimensional space as seen in FIG. 8. The control station 107 undertakes trajectory planning and control, and sends control instructions back to the UAVs 101. A right-handed Cartesian (X-Y-Z) coordinate system is shown but a left-hand Cartesian system or a polar system could also be used.

Figure 2:
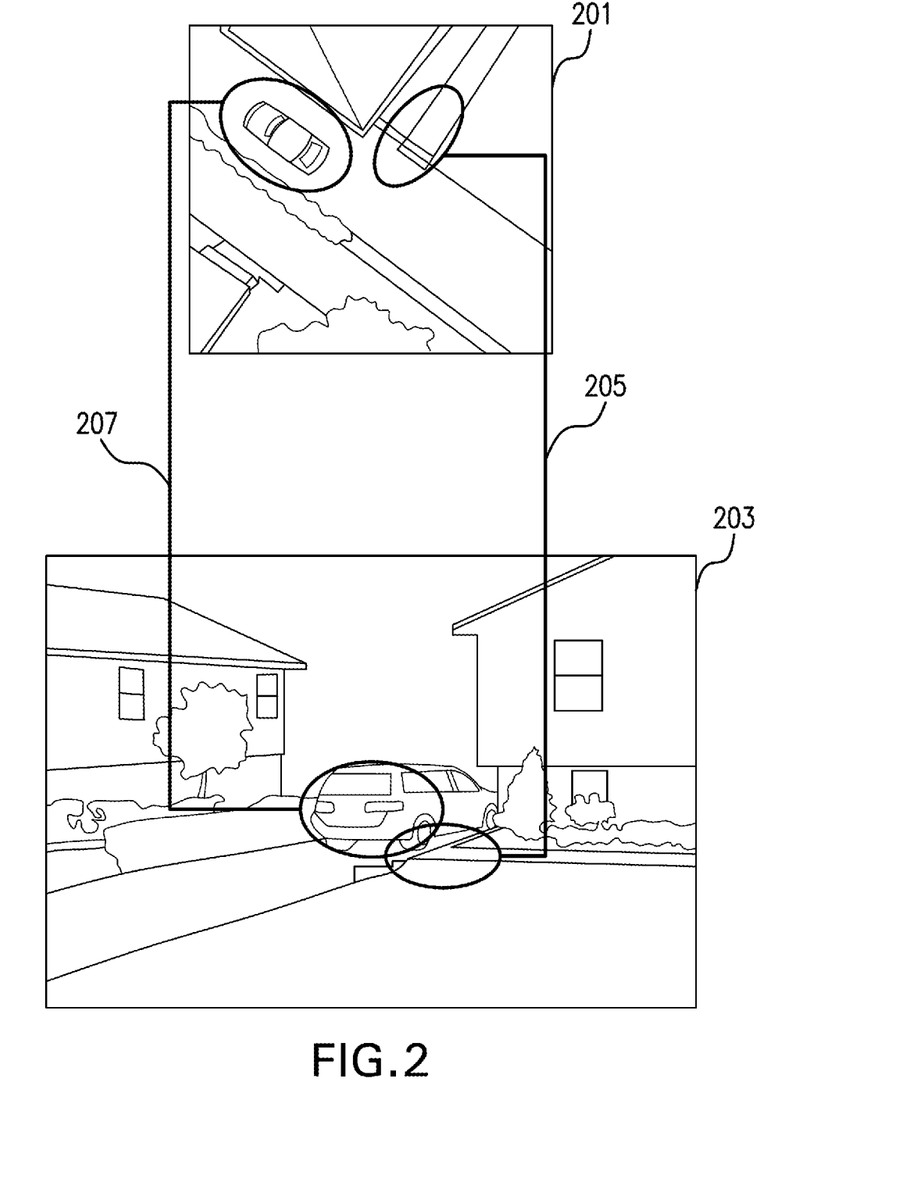
FIG. 2 shows aspects of mutual verification and estimate improvement, in accordance with an aspect of the invention.

FIG. 2 shows an example of mutual verification and estimate improvement. Picture 201 is a first exemplary UAV aerial image while picture 203 is a second exemplary image. Images and location information from multiple cameras can optionally be used to improve the 3D modelling and provide verification automatically via computer vision. The line 205 with corresponding elliptical regions at each end shows comparable regions in each picture (intersection of first and second paved surfaces such as a walkway and a region where an automobile can be parked) while the line 207 with corresponding elliptical regions at each end also shows comparable regions in each picture (parked automobile). Note, however, that these described features are optional, and in one or more embodiments, relative position of UAVs can be calculated based on the camera images from a single UAV, without requiring camera images from other UAVs.

Figure 3:
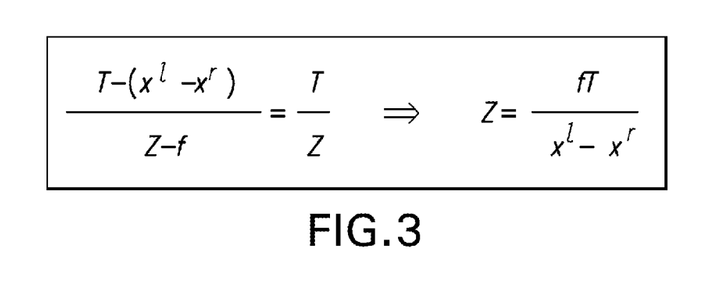
FIGS. 3 and 4 show object depth with disparity calculation, in accordance with an aspect of the invention.
Figure 4:
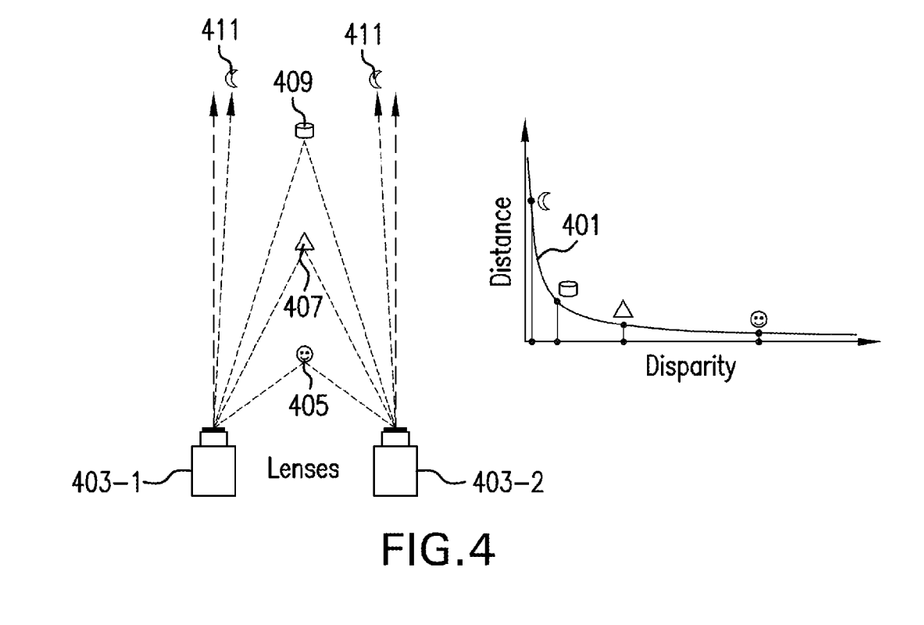

FIGS. 3 and 4 show, respectively, derivation of an equation for object depth with disparity calculation and a graph 401 of distance of perceived objects 405, 407, 409, 411 from a pair of lenses 403-1 and 403-2 (i.e., a twin-lens camera), as a function of disparity. The disparity is smallest for the closest object ("smiley face" 405) and highest for the furthest object (moon 411—two moons 411 shown to represent the single moon in the far distance, as otherwise the diagram cannot fit on the page). In FIG. 3, denote f as the focal length, T as the distance of the camera, Z as the depth of the point, and $x^l$ and $x^r$ as the x coordinate of the point in the images captured in the left lens and right lens, respectively.

Figure 5:
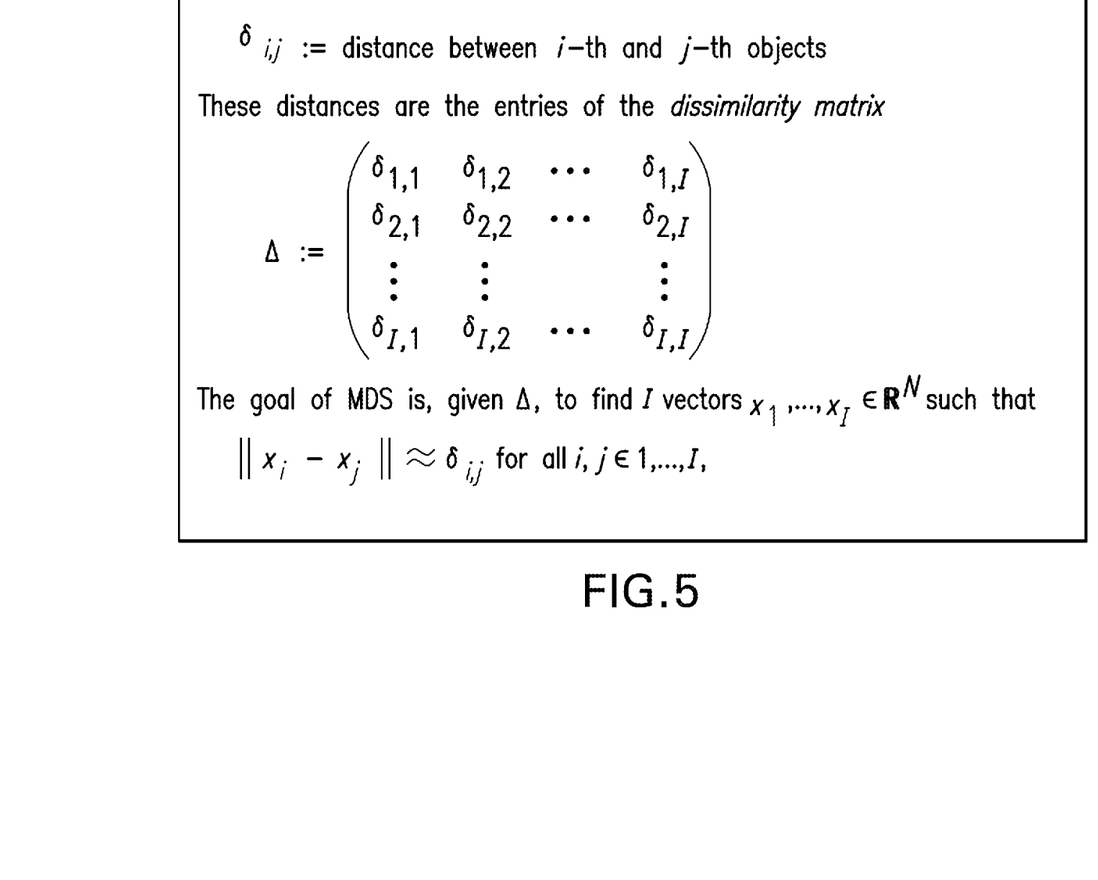
FIG. 5 shows coordinate recovery, in accordance with an aspect of the invention.

Referring now to FIGS. 5 and 8, multidimensional scaling (MDS) is a method of deriving relative coordinates of an object with respect to another object from the relative distance between the objects. One or more embodiments seek to minimize the difference between the distance among any two recovered locations and the observed distance. As seen in FIG. 5, $\delta_{i,j}$ is the value of dissimilarity between the i-th and j-th objects for I objects total, with the dissimilarity matrix $\Delta$ as shown. Given $\Delta$, the goal of MDS is to find I vectors $x_1, \ldots, x_I$ contained in the normed vector space $\mathbb{R}^N$ such that the norm of $x_i - x_j$ is approximately equal to the corresponding matrix element $\delta_{i,j}$ for all i,j contained in 1, ..., I.

Figure 6:
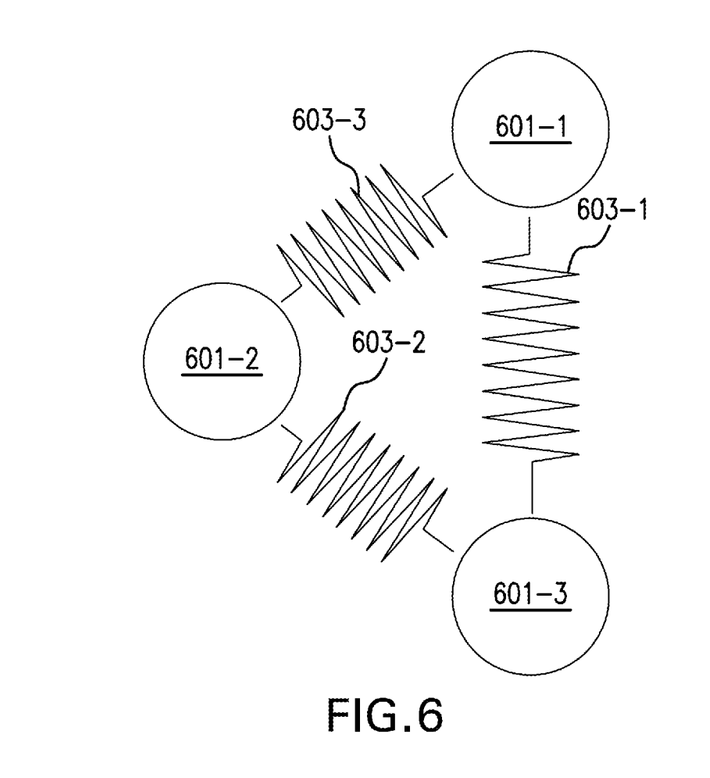
FIGS. 6 and 7 show a spring algorithm for trajectory control, in accordance with an aspect of the invention.
Figure 7:
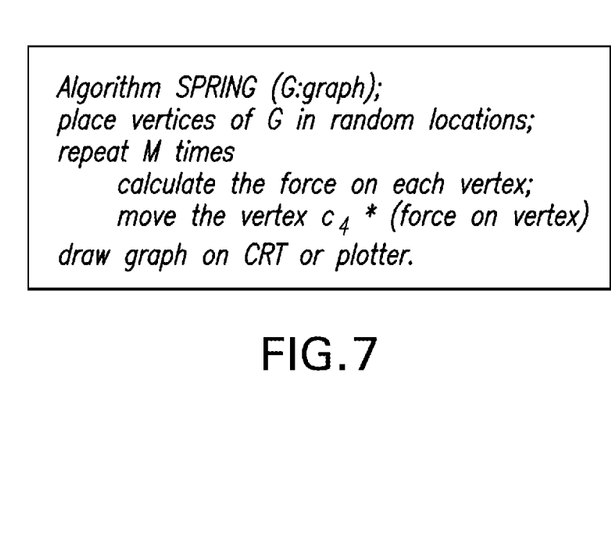

Regarding trajectory control, one or more embodiments seek to keep all UAVs in the local area 111, to move a given UAV from a source (initial location) to a desired destination, and to keep the UAVs away from each other. A spring model as in FIG. 6 is used in one or more embodiments, with the algorithm shown in FIG. 7. Each vertex 601-1, 601-2, 601-3 (collectively 601) in FIG. 6 represents a UAV while each spring 603-1, 603-2, 603-3 (collectively 603) represents the force model between UAVs. The attractive ($f_a$) and repulsive ($f_r$) forces developed by the springs of the model are redefined as:

$$f_a(d) = d^2/k$$

$$f_r(d) = -k^2/d$$

where $k = 3 \times \text{Max}(\text{Width}_{UAVs}, \text{Length}_{UAVs}, \text{Depth}_{UAVs})$.

Note that the forces and springs are mathematical constructs with utility in controlling the UAVs as opposed to actual springs and actual forces with force units (e.g., Newtons). The number of vertices is the number of UAVs. The area is the earth surface area of the region in which the UAVs are to operate. Furthermore in this regard, in FIG. 8, if the UAVs were to operate in the volume $0 \leq x \leq 100$ meters, $0 \leq y \leq 200$ meters, and $0 \leq z \leq 5000$ meters, with Z as altitude, the area would be $0 \leq x \leq 100$ meters, $0 \leq y \leq 200$ meters or 20,000 m².

In one or more embodiments, the 3D modelling of UAVs simplifies the handling of many tasks and the provision of many controls.

One or more embodiments thus advantageously provide a method and/or system for self-coordination among a group of UAVs equipped with double-lens cameras, wherein each UAV takes images using a (double-lens) camera and sends same back to a control station. 3D coordinates are dynamically constructed through these 2D images. Trajectories are planned for each UAV by keeping a safe distance. Furthermore, one or more embodiments provide a system for mutual verification for UAV coordination, wherein images are retrieved from one or more UAVs and one or more local cameras. Objects in these images are matched for verification. Possible matching error is returned to the UAV for more accurate control.

Accordingly, one or more embodiments leverage the on-UAV cameras of multiple UAVs to reconstruct the 3D coordinates of each UAV, and determine its new location (in the next time stamp), so that a UAV can move to a designated location while keeping a safe distance away from other collaborators. One or more embodiments construct a 3D model for the locations of a plurality of UAVs via dual-lens camera technology. One or more embodiments coordinate multiple UAVs' captured images to construct a 3D coordinate model; the more UAVs, the more accurate 3D model will be built. In one or more embodiments, the UAV's flying path is calculated from the distance between each UAV. For example, if two UAVs are too close to each other, one or more embodiments calculate a new path to avoid a crash.

One or more embodiments use computer vision technologies to control a group of UAVs. Indeed, one or more embodiments employ a group of UAVs to work together to communicate and capture data; multiple UAVs are employed to plan and schedule paths and working areas for each UAV. One or more embodiments take as input data images from multiple UAVs' cameras in different angles and positions to get data, and compute a 3D coordinate model of each.

One or more embodiments use cameras carried by UAVs to obtain information. One or more embodiments use image analysis and computer vision to generate 3D coordinates of the UAV's position. One or more embodiments use a group of UAVs to capture images together to construct a 3D coordinate with enhanced accuracy.

One or more embodiments use multiple UAVs to work together as observers for input for the 3D modeling. The 3D modeling in one or more embodiments coordinates each UAV's flying path (as opposed to being used for scanning objects on the ground). Each UAV constructs its 3D model, and a central server or similar control 107 aggregates all of information to improve the accuracy of the 3D model. In addition, one or more embodiments also include planning and scheduling with multiple UAVs all at once.

It is worth noting that some prior art solutions focus on the problem of autonomous aerial refueling of UAVs. Two objects, a UAV and a tanker are involved. Detection and labeling algorithms are used for pose estimation. However, in one or more embodiments of the present invention, multiple UAVs coordinate with each other based purely on depth estimation from one UAV to another, unlike in autonomous aerial refueling, wherein the exact pose matching is needed.

One or more embodiments utilize multiple UAVs with dual-lens cameras such that relative position of UAVs can be calculated based on the camera images from a single UAV, without requiring camera images from other UAVs. One or more embodiments employ only UAV-based cameras and do not require ground-based cameras. In one or more embodiments, path planning, to allow the UAVs to carry out their tasks, is undertaken at control station 107, while collision avoidance is an autonomous function undertaken on-board the UAVs.

One or more embodiments advantageously provide techniques for self-coordination among a group of commercial UAVs equipped with dual-lens camera to construct 3D world and a method to render flying path to keep other UAVs in a distance.

Indeed, one or more embodiments solve the problem of coordinating multiple UAVs, so that these UAVs can work collaboratively while keeping each at a safe distance. This is useful for any circumstance where several UAVs work together, such as collaborative UAV based painting, fine agriculture, cleaning, and gardening.

Figure 10:
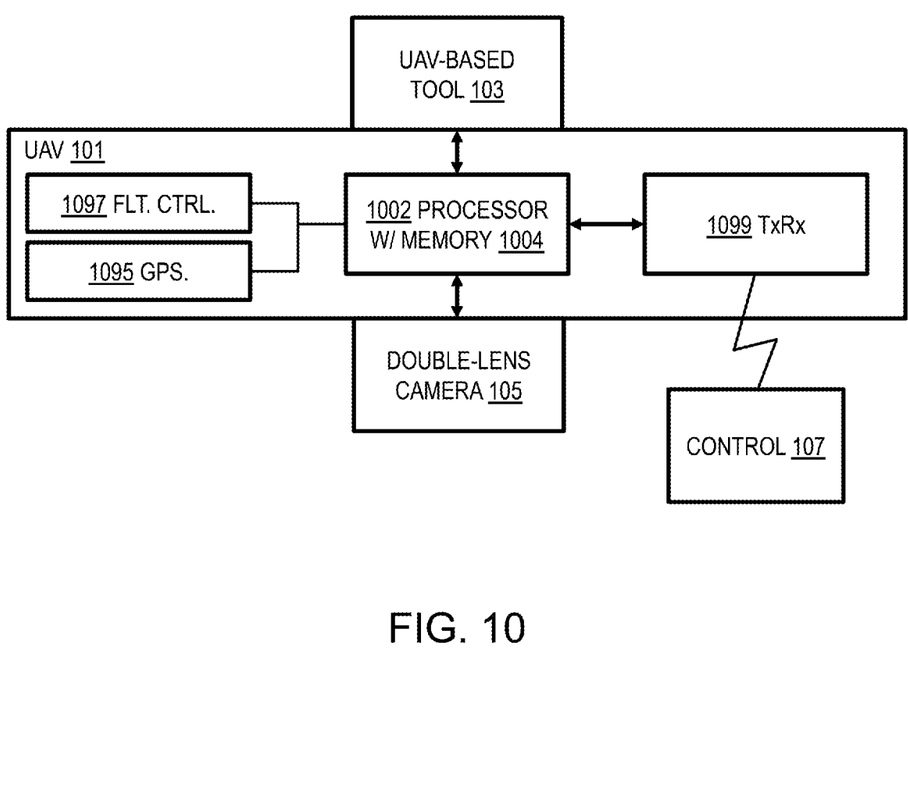
FIG. 10 presents a block diagram of a UAV, in accordance with an aspect of the invention.

Referring to FIG. 10, an exemplary unmanned aerial vehicle (UAV) 101 includes a processor 1002 with an associated memory 1004. A wireless transceiver 1099 is coupled to the processor 1002 for wireless communication with the control station 107. The UAV 101 also includes a tool 103 and double-lens camera 105 as discussed above, coupled to and controlled by the processor 1002. Flight controls 1097 are coupled to processor 1002 and control, e.g., the relative speed of the rotors for a quad copter, the engine speed and wing and empennage control surfaces on an airplane-type UAV, and the like, based on direction from control 107 or locally-generated collision avoidance from processor 1002.

The UAV 101 may include geolocation features such as a GPS transceiver 1095 coupled to the processor 1002.

Given the discussion thus far and with reference to the exemplary embodiments discussed above and the drawings, it will be appreciated that, in general terms, an exemplary method includes, at each of a plurality (two or more) of unmanned aerial vehicles 101 operating in a three-dimensional space 111, determining, based on two-dimensional camera images from on-board dual-lens cameras 105, current relative locations of other ones of the plurality of unmanned aerial vehicles which are visible to each of the plurality of unmanned aerial vehicles. A further step includes wirelessly transmitting the current relative locations to a controller 107. A still further step includes wirelessly receiving, at the plurality of unmanned aerial vehicles 101, from the controller 107, specification of a path to be followed by each of the plurality of unmanned aerial vehicles. An even further step includes, at each of the plurality of unmanned aerial vehicles, carrying out on-board collision avoidance (e.g., based on spring model described herein) based on the two-dimensional camera images from the on-board dual-lens cameras, while following the path specification.

One or more embodiments further include determining the path specification with the controller, based at least in part on the current relative locations.

In one or more embodiments, determining the current relative locations includes applying multidimensional scaling.

In one or more embodiments, each of the plurality of unmanned aerial vehicles carries out a task (e.g., spray painting).

The controller can be located, for example, in a fixed ground-based location or on a control unmanned aerial vehicle. The control unmanned aerial vehicle could be dedicated to control or could be one of the plurality of unmanned aerial vehicles that carries out one or more tasks.

Furthermore, given the discussion thus far and with reference to the exemplary embodiments discussed above and the drawings, it will be appreciated that, in general terms, an exemplary system includes a plurality (two or more) of unmanned aerial vehicles 101 operating in a three-dimensional space 111. Each of the unmanned aerial vehicles in turn includes a memory 1004, at least one processor 1002 coupled to the memory, an on-board dual-lens camera 105 coupled to the processor, and a wireless interface 1099 to a remote controller 107. Each of the processors of the plurality of unmanned vehicles is configured to determine, based on two-dimensional camera images from the on-board dual-lens cameras, current relative locations of other ones of the plurality of unmanned aerial vehicles which are visible to each of the plurality of unmanned aerial vehicles; wirelessly transmit the current relative locations to the remote controller; wirelessly receive, from the remote controller, specification of a path to be followed by each of the plurality of unmanned aerial vehicles; and carry out on-board collision avoidance based on the two-dimensional camera images from the on-board dual-lens cameras, while following the path specification.

One or more embodiments further include the remote controller 107. The remote controller determines the path specification, based at least in part on the current relative locations. The remote controller can be located in a fixed ground-based location or on a control UAV which can be a dedicated control UAV or one of the plurality of UAVs that are being controlled by the system.

In one or more embodiments, the processors of the plurality of unmanned vehicles are configured to determine the current relative locations by applying multidimensional scaling.

In one or more instances, the processors of the plurality of unmanned vehicles are each further configured to cause each of the plurality of unmanned vehicles to carry out a respective task.

Even further, given the discussion thus far and with reference to the exemplary embodiments discussed above and the drawings, it will be appreciated that, in general terms, an exemplary non-transitory computer readable medium includes computer executable instructions which when executed by a computer cause the computer to perform any one, some, or all of the method steps described herein. A "computer" in this context can include, for example, controller 107 and/or the processors 1002 of the UAVs 101. The non-transitory computer readable medium can include, for example, non-volatile memory of the controller 107 and/or non-volatile memory in communication with the processors 1002 of the UAVs 101.

One or more embodiments of the invention, or elements thereof (e.g., the control unit 107), can be implemented, at least in part, in the form of an apparatus including a memory and at least one processor that is coupled to the memory and operative to perform exemplary method steps.

Figure 9:
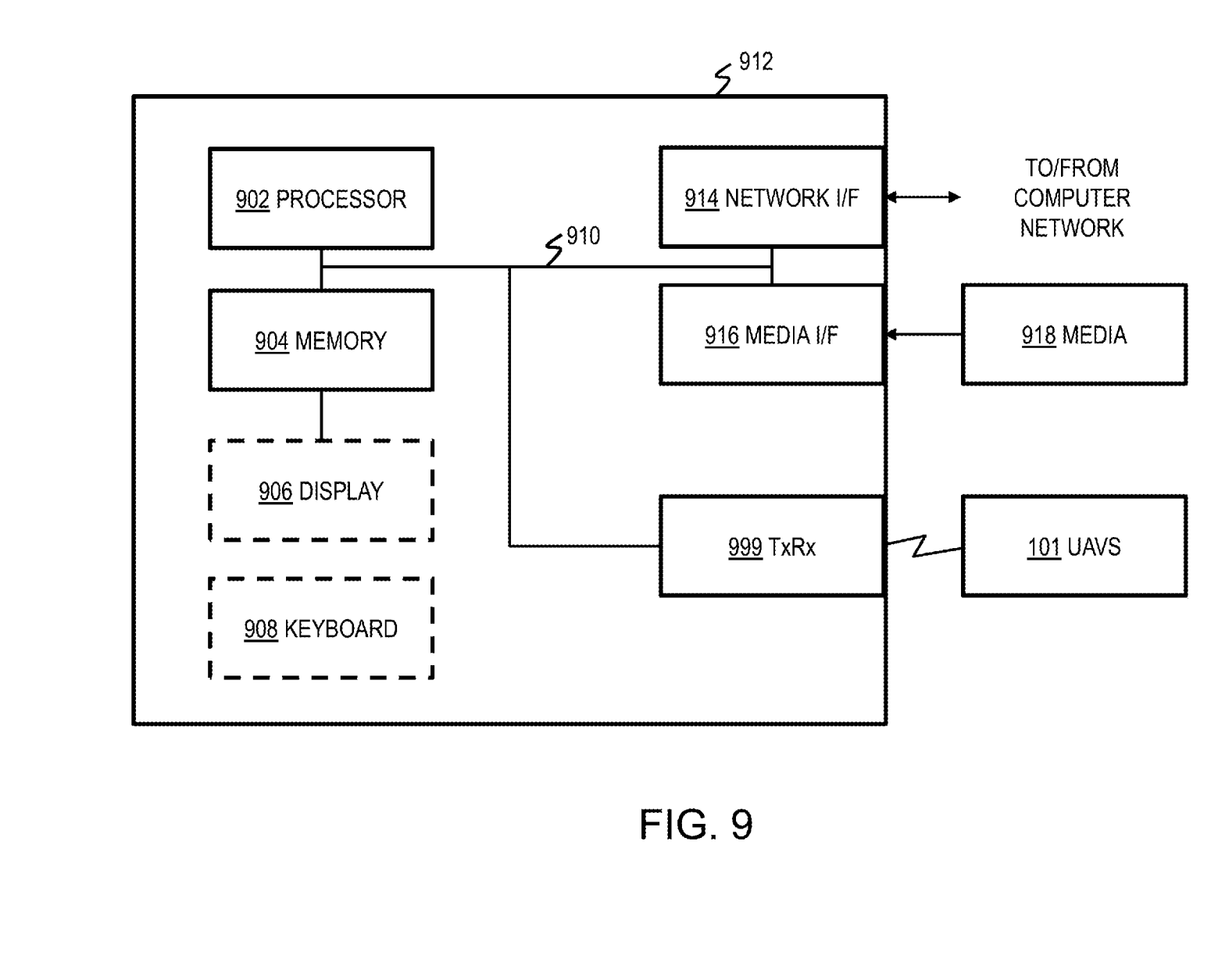
FIG. 9 depicts a computer system, including a wireless transceiver, that may be useful in implementing one or more aspects and/or elements of the invention (e.g. implementing the controller of FIG. 1)

One or more embodiments can make use of software running on a general purpose computer or workstation, which can be modified to include, e.g., a transceiver for UAV communication. The UAVs 101 are controlled, at least in part, by a controller 107 that can be implemented as shown in FIG. 9 (general purpose computer including a transmitter/receiver 999). The device 107 can be, for example, a laptop computer, a smartphone, a tablet, or other suitable device. In addition to the transmitter/receiver 999, the device includes a processor 902 and a memory 904. Applications for controlling UAVs using such devices are known to the art, and may be stored in non-volatile memory and then loaded into volatile memory to configure the processor. With reference to FIG. 9, such an implementation might employ, for example, a processor 902, a memory 904, and an input/output interface formed, for example, by a display 906 and a keyboard 908. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, one or more mechanisms for inputting data to the processing unit (for example, mouse), and one or more mechanisms for providing results associated with the processing unit (for example, printer). The processor 902, memory 904, and input/output interface such as display 906 and keyboard 908 can be interconnected, for example, via bus 910 as part of a data processing unit 912. Suitable interconnections, for example via bus 910, can also be provided to a network interface 914, such as a network card, which can be provided to interface with a computer network; to a media interface 916, such as a diskette or CD-ROM drive, which can be provided to interface with media 918; and to transceiver 999 which wirelessly communicates with UAVs 101. Network interface 914 is also representative of suitable interfaces to acquire signals and/or data. Other interfaces could be used for such acquisition as well; e.g., analog-to-digital converters and the like.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 902 coupled directly or indirectly to memory elements 904 through a system bus 910. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 908, displays 906, pointing devices, and the like) can be coupled to the system either directly (such as via bus 910) or through intervening I/O controllers (omitted for clarity).

Network adapters such as network interface 914 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 912 as shown in FIG. 9) running a server program. It will be understood that such a physical server may or may not include a display and keyboard.

It should be noted that any of the methods described herein can include an additional step of providing a system comprising distinct software modules embodied on a computer readable storage medium (e.g., persistent storage portion of memory 904); the modules can include, for example, any or all of the elements depicted in the block diagrams or other figures and/or described herein. For example, the modules could include a user interface module (e.g., HTML code served out by a server to a browser of a client) to obtain instructions to customize the path of UAVs. Modules can also be provided on the UAVs 101 for collision avoidance and on the controller 107 for path planning. The method steps can then be carried out using the distinct software modules and/or sub-modules of the system, as described above, executing on one or more hardware processors 902, 1002. Further, a computer program product can include a computer-readable storage medium with code adapted to be implemented to carry out one or more method steps described herein, including the provision of the system with the distinct software modules.

Exemplary System and Article of Manufacture Details

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
    at each of a plurality of unmanned aerial vehicles operating in a three-dimensional space, determining, based on two-dimensional camera images from at least an on-board double lens camera of that unmanned aerial vehicle, current relative locations with reference to that same unmanned aerial vehicle of other ones of said plurality of unmanned aerial vehicles which are visible to that same unmanned aerial vehicle, wherein determining said current relative locations comprises applying multidimensional scaling to said two-dimensional camera images;
    wirelessly transmitting said current relative locations from at least one of said plurality of unmanned aerial vehicles to a controller;
    wirelessly receiving, at each of said plurality of unmanned aerial vehicles, from said controller, a specification of a path to be followed by that unmanned aerial vehicle; and
    at each of said plurality of unmanned aerial vehicles, carrying out on-board collision avoidance based on said two-dimensional camera images, while following said path.

2. The method of claim 1, further comprising, with said controller, determining said specifications of said paths to be followed by each of said plurality of unmanned aerial vehicles, based at least in part on said current relative locations of said plurality of unmanned aerial vehicles.

3. The method of claim 2, further comprising, with said controller, constructing enhanced-accuracy 3D coordinates and velocities for each of said plurality of unmanned aerial vehicles by aggregating current relative locations determined at each of said plurality of unmanned aerial vehicles.

4. The method of claim 2, wherein determining said specification of said path to be followed includes constructing 3D coordinates of each of said plurality of unmanned aerial vehicles from said current relative locations of said plurality of unmanned aerial vehicles and applying a spring-force model to said 3D coordinates.

5. The method of claim 1, wherein carrying out said on-board collision avoidance includes constructing 3D coordinates of said other ones of said plurality of unmanned aerial vehicles from said current relative locations and applying a spring-force model to said 3D coordinates.

6. The method of claim 1, further comprising locating said controller on a control unmanned aerial vehicle.

7. The method of claim 1, further comprising receiving, at each of said plurality of unmanned aerial vehicles, specifications of paths to be followed by other ones of said plurality of unmanned aerial vehicles.

8. A system comprising:
    a plurality of unmanned aerial vehicles operating in a three-dimensional space, each of said unmanned aerial vehicles in turn comprising a memory, at least one processor coupled to said memory, an on-board double lens camera coupled to said processor, and a wireless interface to a remote controller;
    wherein each of said processors of said plurality of unmanned aerial vehicles is configured to:
        determine, based on two-dimensional camera images from at least said on-board double lens camera of the unmanned aerial vehicle carrying said processor, current relative locations of other ones of said plurality of unmanned aerial vehicles which are visible to that unmanned aerial vehicle, wherein determining said current relative locations comprises applying multidimensional scaling to said two-dimensional camera images;
        wirelessly transmit said current relative locations to the remote controller;
        wirelessly receive, from the remote controller, a specification of a path to be followed by the unmanned aerial vehicle carrying said processor; and
        carry out on-board collision avoidance based on said two-dimensional camera images from said on-board double lens camera, while following said path.

9. The system of claim 8, further comprising said remote controller, wherein said remote controller determines specifications of paths to be followed by each of said plurality of unmanned aerial vehicles, based at least in part on said current relative locations.

10. The system of claim 8, wherein carrying out said on-board collision avoidance constructing 3D coordinates of said other ones of said plurality of unmanned aerial vehicles from said current relative locations and applying a spring-force model to said 3D coordinates.

11. The system of claim 9, wherein said remote controller is located on a control unmanned aerial vehicle that is one of said plurality of unmanned aerial vehicles.

12. The system of claim 9, further comprising a control unmanned aerial vehicle separate and distinct from said plurality of unmanned aerial vehicles, wherein said remote controller is located on said control unmanned aerial vehicle.

13. The system of claim 9, wherein determining said specification of said path to be followed includes constructing 3D coordinates of each of said plurality of unmanned aerial vehicles from said current relative locations of said plurality of unmanned aerial vehicles and applying a spring-force model to said 3D coordinates.

14. The system of claim 9, wherein said remote controller constructs enhanced-accuracy 3D coordinates and velocities for each of said plurality of unmanned aerial vehicles by aggregating current relative locations determined at each of said plurality of unmanned aerial vehicles.

15. A non-transitory computer readable medium comprising computer executable instructions which when executed by a computer cause the computer to perform the method of:
   at each of a plurality of unmanned aerial vehicles operating in a three-dimensional space, determining, based on two-dimensional camera images from at least an on-board double lens camera of that unmanned aerial vehicle, current relative locations of other ones of said plurality of unmanned aerial vehicles which are visible to that unmanned aerial vehicle, wherein determining said current relative locations comprises applying multidimensional scaling to said two-dimensional camera images;
   wirelessly transmitting said current relative locations from each of said plurality of unmanned aerial vehicles to a controller;
   wirelessly receiving, at each of said plurality of unmanned aerial vehicles, from said controller, a specification of a path to be followed by that unmanned aerial vehicle; and
   at each of said plurality of unmanned aerial vehicles, carrying out on-board collision avoidance based on said two-dimensional camera images, while following said path.

16. The non-transitory computer readable medium of claim 15, wherein said computer executable instructions cause said controller to determine said specifications of said paths to be followed by each of said plurality of unmanned aerial vehicles, based at least in part on said current relative locations of said plurality of unmanned aerial vehicles.

17. The non-transitory computer readable medium of claim 15, wherein said computer executable instructions cause said controller to construct enhanced-accuracy 3D coordinates and velocities for each of said plurality of unmanned aerial vehicles by aggregating current relative locations determined at each of said plurality of unmanned aerial vehicles.

18. The non-transitory computer readable medium of claim 16, wherein determining said specification of said path to be followed includes constructing 3D coordinates of each of said plurality of unmanned aerial vehicles from said current relative locations of said plurality of unmanned aerial vehicles and applying a spring-force model to said 3D coordinates.

19. The method of claim 1, wherein determining said current relative locations comprises applying multidimensional scaling to two-dimensional camera images obtained from a plurality of on-board double lens cameras each mounted on a respective one of said plurality of unmanned aerial vehicles.

20. The system of claim 8, wherein determining said current relative locations comprises applying multidimensional scaling to two-dimensional camera images obtained from a plurality of on-board double lens cameras each mounted on a respective one of said plurality of unmanned aerial vehicles.

* * * * *